3,165,380
PLASTIC HYDRATE OF LIME
Irving Warner, Wilmington, Del.; Wilmington Trust Company and Irving Warner, Jr., executors of said Irving Warner, deceased
Filed Apr. 20, 1962, Ser. No. 189,203
4 Claims. (Cl. 23—188)

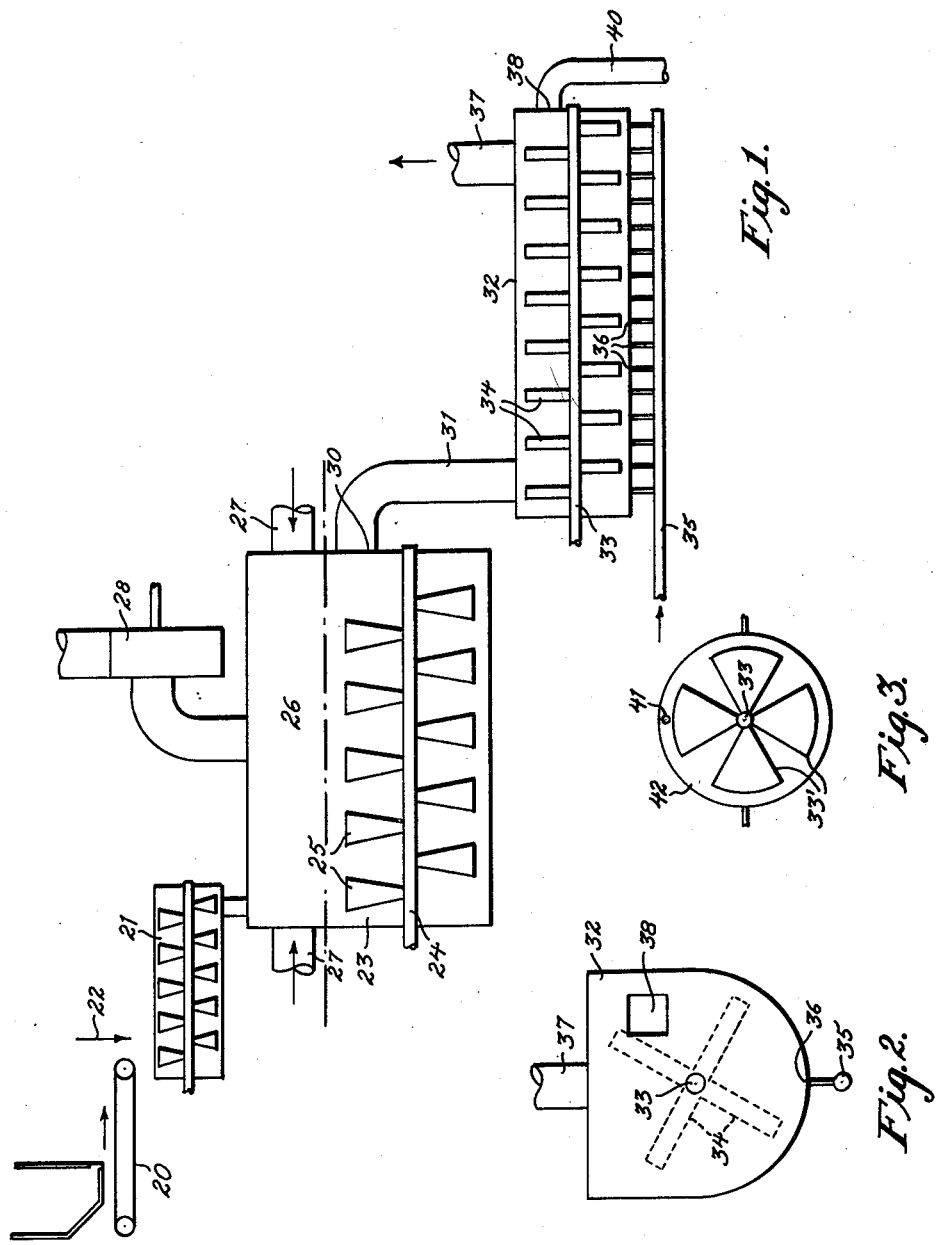

The present invention relates to a process for the production of a dry hydrate of lime, particularly of high calcium lime (in excess of 95% CaO), but applicable to any lime that is commercially acceptable to the trade as a quick lime or hydrate, such as a dolomitic lime.

The present application is a continuation-in-part of my copending application Serial No. 16,678, filed March 22, 1960, for Hydration of Lime to Produce a Plastic Hydrate, now abandoned.

A purpose of the invention is to produce a raw hydrate of lime that can be plasticized by known methods of milling, by a process carried on at atmospheric pressure that is simpler and more economical than existing processes and which will produce a product that is superior to that produced by any atmospheric process now in use.

Another purpose of my invention is to produce a raw hydrate containing less than 10% free water which amount is within the ability of a kiln mill to finish without prior drying. There are now existing atmospheric processes that produce a raw hydrate containing as much as 40% free water which product requires drying before milling. This operation of drying is costly in equipment and operation and is avoided by my invention.

In the drawings I have chosen to illustrate a few only of the devices which may be useful in practicing the process.

FIGURE 1 is a diagrammatic central vertical section of a device in which the process of the invention is being applied.

FIGURE 2 is an enlarged front elevation of a portion of the mechanism of FIGURE 1.

FIGURE 3 is a vertical section through a different form of secondary hydrator which can be employed in the present invention.

A plastic lime hydrate is defined as one meeting the type S specification of the Bureau of Standards. As a practical matter, in addition to the specification, to be acceptable to the trade, it must work well as an ingredient of masonry mortar and be plastic in manipulation when used as a component of plaster or stucco.

Certain dolomitic hydrators made in Ohio by atmospheric hydration are considered to be plastic by the trade although they do not meet the type S specification.

There are many artificially plasticized hydrates on the market. The best are those made from dolomitic lime by a pressure process. The few artificially plasticized high calcium hydrates produced by atmospheric processes are less acceptable to the trade. And, as stated above, their processing requires a costly drying operation.

Lime, either in slaking to a milk or in hydrating, to a dry of substantially dry product, develops considerable heat of the order of 500 B.t.u. per pound of CaO. When slaking to a milk of lime, the temperature of the charge can be held to any desired maximum by a suitable excess of water.

In hydrating to a dry or substantially dry product, the energy of the reaction is largely dissipated by the boiling off of excess water as steam. It is standard practice to add sufficient excess water in the hydrator to provide the necessary endothermic requirement and end up with a product containing little or no excess free water, capable of being milled by normal means. Such hydrates are not plastic.

In such processing, the temperature of the charge is necessarily above that of boiling water, that is 212° F. at sea level. It is known that local spots of the charge are at a much higher temperature. Much of the hydration of the CaO is effected by steam and even by super heated steam rather than by water.

It is known that the best hydrate is formed if the chemical reaction is effected by liquid phase water and at a temperature below 200° F. so that no steam is evolved. It is cited by some authorities that 180° F. is the optimum temperature.

I have discovered that it is possible to keep a hydrating charge below 200° F. and even at 180° F. solely by the heating and humidification of air provided that intimate contact is established between the charge and air properly applied. At 180° F. and above the vapor tension of the excess water in the charge is high and there is a strong affinity between the water and air to humidify the air to a high relative humidity. Such air heated to 180° F. and 100% relative humidity has a high heat content so that only 0.80 pound of air are needed to absorb the energy of 1 pound of CaO. For a plant producing 12 tons per hour, less than 3700 c.f.m. is required. This principle of utilizing the heating and humidification of air as the sole endothermic agent for absorbing the heat of hydration has not hitherto been employed.

When lime is hydrated in a batch hydrator where it can be observed, it is noted that there is a period of violent hydration which, in a minute or two, tapers off to a mild simmer which may last a considerable length of time. Even a good quick lime will contain a small percentage of slowly reacting fractions. It is well known that the primary hydration will take place even under a condition of vigorous agitation. The slow residual hydration requires a different environment for proceeding quickly to completion. For the residual hydration, the charge must have a minimum of agitation, being barely enough to keep the charge in a fluidized well mixed condition.

Residual hydration likewise generates heat which must be dissipated by the heating and humidification of properly supplied and controlled air. Not only must the charge be prevented from rising above 200° F., but it should also be controlled so the temperature does not go below 180° F. This expedites the reaction to completion. Since the boiling point of water varies with the atmospheric pressure, for practical results the temperature of the charge should always be at least 10° below the boiling point of water. This applies both for vigorous and for residual hydration, and allows for the variation with altitude of the location of the plant.

While it is possible to design one machine in which the two conditions of hydration will proceed properly by a variation in the type of blades or paddles and method of admitting the air, the preferred environment is so different that I prefer to carry on the process in two separate hydrators, each designed to give the optimum condition respectively for vigorous and residual hydration.

Without attempting to limit to a particular plant, I illustrate in FIGURES 1 and 2 a suitable installation according to the invention.

Quick lime fed at 20 enters a premixer 21 into which a metered supply of water is provided at 22. The maximum mesh size of the quick lime fed at 20 is not critical, although in general it should not be larger than that which passed a ⅛ inch sieve. The optimum size for a particular installation may be determined by experiment. The premixed quick lime and water enters pug mill primary hydrator 23 which has a horizontal rotating shaft or shafts 24 provided with blades or flights 25, and has a freeboard space 26 above the path of the blades into which the charge will be propelled by the blades. The height of the freeboard space is preferably at least one and a half times the diameter of the blades. A dot-and-dash line across the primary hydrator shows that it is broken for illustration purposes and will actually be, in the best use of the invention, higher than shown. The speed of rotation is designed to cause the charge to fill the freeboard space. Air at ambient temperature is suitably introduced at both ends of the freeboard space through ports 27 and withdrawn suitably in the middle of the top by exhaust fan 28. Any means of air flow to give good contact between the air and the tossed charge will meet the requirements of the present invention.

While the drawing indicates a single shaft pug mill which will serve properly, I prefer to use a mill having two shafts, one beside another. Thereupon there are four curtains of the charge in the freeboard space, one going up and another falling for each shaft. The air can be made to cross the freeboard so that it has four passes through the charge. This makes for maximum efficiency of contact between charge and air.

It is also to be noted that the area of the curtains of lime can be increased by a greater height of the freeboard and speeding the shafts to fill the space to the top. Increasing the curtain contact area may be necessary with a lime of great activity.

An adjustable overflow dam 30 determines the depth of the charge in the primary hydrator, and charge rising above the dam passes by chute 31 into the second stage hydrator 32 having a horizontal rotating shaft 33 provided with flights or paddles 34. Ambient air enters under suitable blowing pressure at 35 through tuyeres 36 distributed along the bottom of the secondary hydrator and hot moist effluent air leaves through stack 37 near the outer end. Adjustable dam 38 at the outer end determines the depth of the charge in the secondary hydrator and charge rising above the dam discharges through chute 40.

For the secondary hydrator a single shaft is preferable with charge level nearly to the top of the blade circle. In this way there is a maximum depth of the charge through which the air will trickle.

In an alternative design as shown in FIGURE 3, air enters the secondary hydrator at a port 41 at the inlet end and is caused to take a labyrinthal path by staggered flights 33' turning on shaft 33 similar to blades of a screw propellor on a ship, with small pitch, the housing in this case being of circular cross section rather than rectangular at the top as shown in FIGURE 2 in order to force the air to make contact with the flights. The moist air discharges through the stack 37 as in the form of FIGURES 1 and 2.

It will be obvious that various designs can be used for the secondary hydrator and as long as the secondary hydrator keeps the charge in a state of mild fluidation and provides contact with air to secure sufficient cooling to prevent a rise in temperature to that of boiling water, the operation will be sufficient for the invention.

The quantity of air in the secondary hydrator should be so controlled that the temperature of the charge will not be unduly lowered below 180° F. With lower temperature the rate of reaction of the less reactive particles is greatly reduced. I do not limit myself to a minimum temperature of 180° F. but recommend it as a minimum for rapid processing and the assurance of a sound product containing no free CaO. For most efficient operation, therefore, the secondary hydrator should be maintained at a maximum safe temperature while avoiding generation of steam. This will increase the production of the plant, and encourage the production of completely hydrated lime.

It is not necessary to cool the raw hydrate discharged from the secondary hydrator, since the hydrate can be immediately milled in a so-called kiln mill as mentioned below. It is important that condensation of moisture should not take place on the cold surfaces of the secondary hydrator or on any equipment subsequent thereto. Such condensation causes local concentration of water in the charge which is undesirable. The heat of the exothermic reaction should be dissipated as far as possible by the humidification of air at a temperature below that of boiling water and loss of heat by radiation of equipment kept at a minimum by insulation. Radiation of the primary hydrator is not harmful and it preferably should not be insulated.

If in a particular plant is is necessary to locate the finishing mill a considerable distance from the secondary hydrator, then it will be desirable to cool the hydrate by air. This can readily be accomplished by any well known unit such as a ribbon conveyor with a counterflow of air. It is even possible to make the discharge end of the secondary hydrator act as a cooler by introducing a large amount of air at or near the discharge end.

In summary, in the best embodiment of the present invention, the hydration of the lime is carried out in two separate steps or stages under different conditions. In both of these steps, the heat is dissipated by the heating and humidification of air at a temperature below that of boiling water so that no steam will be generated. In the first stage or primary hydrator, hydration of the active fractions of the lime takes place under a condition of violent agitation in such manner as to give intimate contact with a stream of air.

On the other hand, the secondary hydrator or stage is comparatively quiet, with time to complete the residual hydration of the slower fractions, with introduction of ambient air to absorb the heat generated by the residual hydration.

It is reiterated that the two stages of hydration can be accomplished in one hydrator of proper design. But the required environment for the fast and residual hydration are so different that better control and an assured good product are best obtained by carrying on the two stages in two separate hydrators.

It is accepted good practice in any system for hydrating lime, to provide a rapid permixer for thorough blending of lime and water. Any normal mix of lime and water produces a slurry in which the water tends to segregate if the slurry is in a quiescent condition. Therefore, a small amount of hydration is desirable in the premixer to reduce the slurry to a condition where segregation cannot take place. This is common practice. This premixer should not be confused with the first stage hydrator of the present invention. Such premixers do not accomplish any important amount of hydration and do not produce the intimate contact here contemplated between the hydrating charge and air.

In accordance with the present invention, as noted above, it is recommended that a premixer be employed for feeding the first stage hydrator, but care must be taken that no important rise of temperature take place in the premixer, to a point which would cause the generation of steam before discharging into the first stage hydrator. This is readily taken care of by selective admission points of water in the length of the premixer which permits variation of time in the premixer. This is current practice in the art.

The requirements for milling to plasticize a hydrate are well known in the production of pressure hydrated dolomitic lime, and in the existing processes for the plasticizing of high calcium limes containing free water. It is, therefore, not intended to repeat this matter in the present disclosure, since prior practice will be followed in the milling of the hydrate. Due to the presence of 2 to 10% by weight of free water in the raw hydrate, milling must be accomplished in a kiln mill wherein heated gas or air is supplied to the mill to dry the charge during milling.

Kiln mills can usually operate satisfactorily on a feed containing up to 15% free moisture by weight. Such a high percentage of moisture reduces the output of the mill and increases the cost of supplying heat. With the process of my invention, it is possible to control the maximum temperature during hydration with as little as 3% free moisture as determined when the raw hydrate is discharged hot from the secondary hydrator. The maximum temperature of the charge in finishing which can be used without impairing the quality of the product must be determined by experience but should not exceed a maximum of 200° F.

Some free moisture in the feed to the mill is necessary to facilitate agglomeration. These agglomerates break down into graded grain size which is one of the essential requirements of a plasticized hydrate. The minimum amount of this free water will vary with different limes and the excellence of processing, and can only be determined by experience. In general, 5% free water should be ample. In the interest of economic mill operation, the amount of free water should be kept to a minimum and still meet the objective of the process in keeping below the maximum temperature during hydration.

The above has been written particularly with reference to limes high in calcium oxide because of their greater activity and difficulty in hydrating, but similar procedure may be followed in hydrating dolomitic lime.

When reference is made herein to percent it is intended to refer to percent by weight.

While it is not necessary to dry the raw hydrate, the addition of a dryer between the secondary hydrator and the finishing mill does not depart from the spirit of the invention and it is contemplated that this will be done when found desirable.

It will be evident, for example, that an operator could employ a suitable conveyor such as a ribbon conveyor in order to cool and partially dry the product before milling. This may be done for example by passing ambient air through the conveyor to avoid steaming of the hydrate with subsequent undesirable condensation if the delivery point of the mill is remote. In fact, this should be done since insulation is only partially effective to avoid loss of heat. If, for example, it was found that for the necessary low temperature hydration it was desirable to end up with say 8% water in the mill feed, very much higher and more efficient mill production could be obtained if the mill feed were dried to the minimum water content at which agglomeration would take place, say 3% free water. Then some heat could advantageously be applied in the ribbon conveyor which has already been mentioned.

In view of my invention and disclosure, variations and modifications to meet individual whim or particular need will doubtless become evident to others skilled in the art, to obtain all or part of the benefits of my invention without copying the process shown, and I, therefore, claim all such insofar as they fall within the reasonable spirit and scope of my claims.

Having thus described my invention what I claim as new and desire to secure by Letters Patent is:

1. A process of hydrating lime to produce a raw hydrate containing less than about 10% free water and suited to be plasticized by milling, which comprises premixing lime particles with liquid water, the water being in sufficient quantity to hydrate the lime plus excess water in sufficient quantity to absorb heat of reaction by evaporation, and blowing ambient air having a susceptibility to humidification through the lime and water mixture in intimate contact with the mixture while the lime is hydrating and producing the raw hydrate with humidification of the air and thus taking off vapor of the water and heat from the hydrating lime, the quantity of ambient air susceptible to humidification being regulated to keep the temperature of the mixture at least 10° F. below the boiling temperature of the water and thus prevent the formation and evolution of steam by heat of hydration of the lime.

2. A process of claim 1, which comprises regulating the quantity of air to maintain the temperature of the mixture at least 180 degrees F.

3. A process of claim 1, wherein the hydration is accomplished in two stages, which comprises maintaining vigorous agitation of the mixture of lime and water during a first stage, and during a second stage continuing the hydration while mildly agitating the mixture of lime and moisture to assure complete hydration of the slowly reacting fractions.

4. A process of hydrating lime to produce a raw hydrate containing less than about 10% free water and suited to be plasticized by milling, which comprises premixing lime particles with liquid water, the water being in sufficient quantity to hydrate the lime plus excess water in sufficient quantity to absorb heat of reaction by evaporation, projecting the lime particles into the air so that the lime particles become airborne, and blowing ambient air having a susceptibility to humidification through the airborne mixture of lime and water in intimate contact with the mixture while the lime is hydrating and producing the hydrate with humidification of the air and thus taking off vapor of the water and heat from the hydrating lime, the quantity of ambient air susceptible to humidification being regulated to keep the temperature of the mixture at least 10° F. below the boiling temperature of the water and thus prevent the formation and evolution of steam by heat of hydration of the lime.

References Cited in the file of this patent

UNITED STATES PATENTS

| 802,354 | Ellis | Oct. 17, 1905 |
|---|---|---|
| 1,511,446 | Doyle | Oct. 14, 1924 |
| 2,149,269 | Brooks et al. | Mar. 7, 1939 |
| 2,784,062 | Locke et al. | Mar. 5, 1957 |
| 2,833,626 | Knibbs et al. | May 6, 1958 |
| 3,044,857 | Sable | July 17, 1962 |